United States Patent
Lehman, Jr. et al.

(10) Patent No.: US 6,212,014 B1
(45) Date of Patent: *Apr. 3, 2001

(54) MWIR POLARIZING BEAMSPLITTER CUBE AND METHOD OF MAKING THE SAME

(75) Inventors: John G. Lehman, Jr.; J. Michael Finlan; Kevin M. Flood; Mary E. Gerard, all of Exton, PA (US)

(73) Assignee: LSA, Inc., Arlington, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,885

(22) Filed: Sep. 29, 1998

Related U.S. Application Data

(60) Provisional application No. 60/060,355, filed on Sep. 29, 1997.

(51) Int. Cl.[7] ............................ G02B 27/12; G02B 27/14; G02B 5/30
(52) U.S. Cl. ........................... 359/640; 359/638; 359/495
(58) Field of Search ..................................... 359/640, 638, 359/639, 352, 495, 496, 634

(56) References Cited

U.S. PATENT DOCUMENTS

| | | |
|---|---|---|
| 3,704,934 * | 12/1972 | Holme .................................. 359/487 |
| 4,411,492 | 10/1983 | Bluege . |
| 4,431,258 | 2/1984 | Fye . |
| 4,597,630 | 7/1986 | Brandstetter . |
| 4,627,688 | 12/1986 | Kobayashi . |
| 4,733,926 * | 3/1988 | Title ...................................... 350/1.1 |
| 5,173,432 * | 12/1992 | Lefkowitz ............................ 436/138 |
| 5,243,465 | 9/1993 | Fein . |
| 5,351,152 | 9/1994 | Kuo . |
| 5,440,424 | 8/1995 | Wu . |
| 5,579,159 | 11/1996 | Kabushik . |
| 5,596,451 | 1/1997 | Handschy . |
| 5,610,765 | 3/1997 | Colucci . |
| 5,646,778 | 7/1997 | Shuman . |
| 5,657,164 | 8/1997 | Shuman . |
| 5,683,480 * | 11/1997 | Taniguchi ............................. 65/17.2 |
| 5,719,705 * | 2/1998 | Machol ................................ 359/581 |
| 6,018,418 * | 1/2000 | Pan et al. ............................. 359/495 |

* cited by examiner

Primary Examiner—Georgia Epps
Assistant Examiner—Saeed Seyrafi
(74) Attorney, Agent, or Firm—Reed Smith Hazel & Thomas LLP

(57) ABSTRACT

A polarizing beamsplitter cube, such as for midwave infrared spectral applications, comprises two ZnSe 45° prisms, an adhesion layer and a thin-film polarization coating layer that are deposited onto the hypotenuse of the first prism, a refractive index liquid layer that provides an interface between the prisms that defeats total internal reflection when the prisms are joined together, and a urethane adhesive that permanently seals and encapsulates the liquid. The adhesion layer consists of 100 Å thorium fluoride and 50 Å chromium layers. The polarization coating (PC) comprises alternating layers of zinc sulfide (ZnS) and germanium (Ge) which are deposited by vapor deposition.

17 Claims, 3 Drawing Sheets

MWIR POLARIZING BEAMSPLITTER CUBE AND METHOD OF MAKING THE SAME

This application claims the benefit of U.S. Provisional Patent Application Ser. No. 60/060,355, filed Sep. 29, 1997, titled "MWIR Polarizing Beamsplitter Cube."

This invention was made with Government support under contract DAAH01-95-C-R053 awarded by the United States Army. The Government has certain rights in the invention. The U.S. Government has a paid-up license in this invention and the right in limited circumstances to require the patent owner to license others on reasonable terms as provided by the terms of DAAH01-95-C-R053 awarded by the United States Army.

FIELD OF THE INVENTION

The present invention relates to the field of optical beamsplitters, and to an improved midwave infrared polarizing beamsplitter cube and method of fabricating such cubes.

BACK GROUND OF THE INVENTION

A polarizing beamsplitter cube, first described by Mary Banning in "Practical Methods of Making and Using Multilayer Filters" J. Opt. Soc.Amer., Vol. 37, pages 792–797, (147) comprises two 45 degree prisms, one coated with a thin film polarizing coating on the hypotenuse, and the second cemented to the coated hypotenuse of the first prism to form a cube. This article described beamsplitter fabrication for visible wavelengths. Standard optical cements, having approximately the same index of refraction as the prisms, are typically used to join the prisms together. However, this technique cannot be used in the infrared region of the spectrum, because infrared transmitting materials have a much higher index of refraction. The index of refraction mismatch between all known optical cements and infrared transmitting materials creates total internal reflection (TIR) at the prism-to-prism interface, so that there is little or no transmission through the resulting cube.

One method of fabricating an infrared polarizing beamsplitter that minimizes TIR has been described in U.S. Pat. No. 4,733,926 to Title. This patent discloses join the prisms are joined together via optical contacting, by applying a relatively thick layer of prism material over a thin film polarizing coating. This provides a surface that can be optically polished and then, through Van der Wahls forces, can be brought into optical contact with the other optically polished prism hypotenuse. However, this reference does not disclose the use of a Germanium polarization coating or the use of any special refractive index materials between the prisms.

Beamsplitters of the type shown in the Title patent are difficult, time-consuming, and costly to manufacture. In order to obtain optical flatness, the prism that has the thin film polarization coating must have an additional coating of the prism material applied over the polarization coating. This adds another coating step to the fabrication process, increasing labor and material costs. Additionally, this layer must be optically polished which requires additional handling by experienced optical and quality personnel. This additional coating process adds to the complexity of the coatings and provides an extra step that could potentially damage the previously applied polarization coating. Also, this extra coating adds thickness and therefore weight to the polarization coating, which increases the tendency of the polarization coating to delaminate and flake from the prism.

Further, optical contacting methods produce only marginal transmission performance because there is still a small air gap between the two prisms. In order to defeat total internal reflection at the prism interface, the air gap created from the two optically polished surfaces must be a very small fraction of the wavelength of light. For optically contacted prisms, acceptable beamsplitter performance requires at least a surface flatness of $\lambda/100$, which is difficult to meet with optical polishing. Finally, optical contacting only creates a semi-permanent bond between the prisms, which can come apart over time.

Additional beamsplitting devices known in the prior art are shown in U.S. Pat. No. 4,411,492 to Bleuge, U.S. Pat. No. 4,431,258 to Fye, U.S. Pat. No. 4,597,630 to Brandstetter et al., U.S. Pat. No. 4,627,688 to Kobayashi et al., U.S. Pat. No. 5,243,465 to Fein, U.S. Pat. No. 5,351,152 to Kuo et al., U.S. Pat. No. 5,440,424 to Wu et al., U.S. Pat. No. 5,579,159 to Ito, U.S. Pat. No. 5,596,451 to Handschy et al., U.S. Pat. No. 5,610,765 to Colucci, and patents U.S. Pat. Nos. 5,646,778 and 5,657,164 to Schuman. Similarly, none of these devices solve the problems experienced with making beamsplitter cubes that operate effectively in the infrared range.

Thus, there is a need for an improved infrared range beamsplitter and for an improved manufacturing method for making such beamsplitters.

SUMMARY OF THE INVENTION

Accordingly, it is a general object of the invention to provide a bonding method for joining two prisms together so that the ensuing interface defeats total internal reflection.

It is also a general object of the invention to provide an improved beamsplitter assembly incorporating a sealed liquid interface between prismatic elements.

Another object of the invention is to provide a bonding method for prismatic elements of a beamsplitter which reduces optical and mechanical fabrication tolerances, which is relatively inexpensive to fabricate, which provides better polarizing performance, and which provides an improved method of fabricating infrared polarizing beamsplitter cubes.

Still further objects and advantages will become apparent upon consideration of the ensuing description and accompanying drawings.

The Midwave Infrared (MWIR) Polarizing Beamsplitter Cube of the present invention may be used to separate p and s polarization states of infrared radiation, such as radiation in the 3000 nm–5000 nm wavelength region, into two orthogonal paths. The polarization of the radiation incident on any face of the cube will be predominantly transmitted straight through the cube. The s polarization of the radiation incident on any face of the cube will be predominantly reflected orthogonal to the incident direction.

In a preferred embodiment, the polarizing beamsplitter cube comprises two ZnSe 45° prisms, an adhesion layer and a thin-film polarization coating layer that are deposited onto the hypotenuse of the first prism, a refractive index fluid layer that provides an interface between the prisms that defeats total internal reflection when the prisms are joined together, and a urethane adhesive that encapsulates the fluid. The adhesion layer may consist of 100 Å thorium fluoride and 50 Å chromium, while the polarization coating may be constructed from alternating layers of zinc sulfide (ZnS) and germanium (Ge) which are deposited by vapor deposition. The refractive index fluid is preferably Cargille M Series Refractive Index Liquid (n($\lambda$=5893 A)=1.78), and the Urethane adhesive (UA) is Hardmans Kalex® Urethane. The refractive index fluid is placed on the hypotenuse of the first prism which has been coated by vacuum deposition, with the adhesion and polarization coating. The second prism is placed on top of the first prism to form a transparent interface that defeats total internal reflection. A bead of urethane adhesive is used to permanently seal the index fluid between the first and the second prisms.

DETAILED DESCRIPTION OF THE PREFERRED EMBODIMENTS

Figure 1:
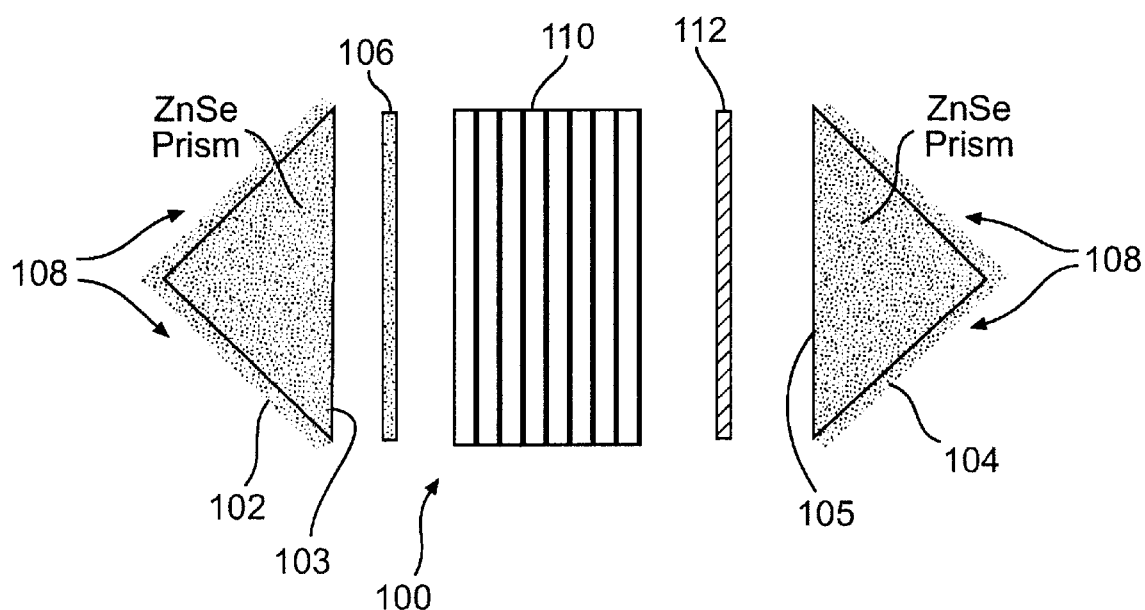
FIG. 1 is an exploded top view of the polarizing beamsplitter cube showing thin-film adhesion and polarizing layers and a refractive index liquid layer located between the prisms.

FIG. 1 shows an exploded schematic assembly diagram of one preferred embodiment of the midwave infrared polarizing beamsplitter cube according to the present invention. The beamsplitter comprises two 45° prisms 102 and 104, an adhesion layer 106, a thin-film polarization coating layer 110, and a refractive index liquid layer 112. The legs of first prism 102 and second prism 104 are provided with a coating 108 that results in broadband anti-reflection properties for the midwave infrared region of the spectrum. Adhesion layer 106 is applied to the hypotenuse 103 of first prism 102 to increase the adhesion of the thin-film polarizing coating 110. The polarization coating 110 of alternating high and low index of refraction material is applied over adhesion layer 106. A thin layer of refractive index liquid 112 is placed between first prism 102 and second prism 104 and encapsulated by urethane adhesive (omitted for clarity—shown in FIG. 2).

Figure 2:
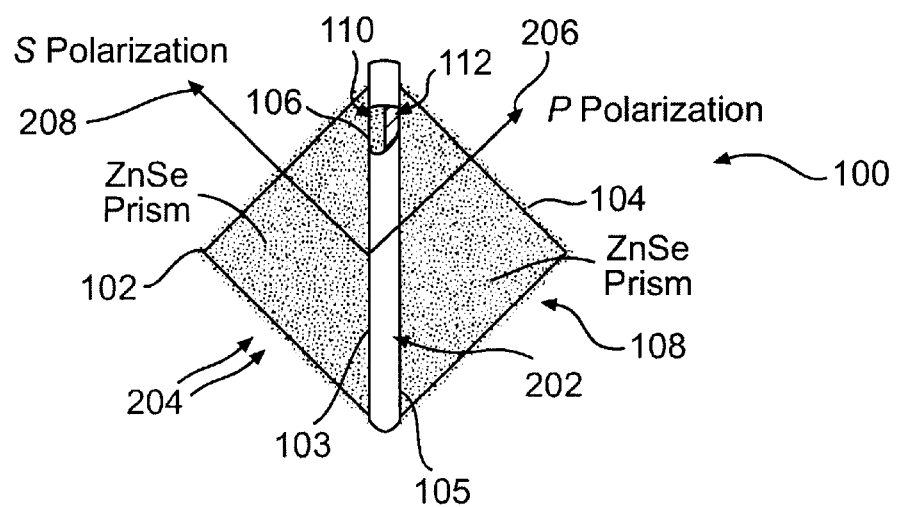
FIG. 2 is a top view of an assembled polarizing beamsplitter according to the present invention showing the location of the refractive index fluid and the urethane adhesive.

FIG. 2 shows an assembled view of the beamsplitter described in FIG. 1. In accordance with the invention, the refractive index liquid 112 is sealed between first prism 102 and second prism 104 with urethane adhesive 202 around the entire perimeter of the interface.

In a preferred embodiment of the present invention, which is designed for the midwave infrared region of the spectrum, prisms 102 and 104 are made from zinc selenide. Adhesion layer 106 has two parts, comprising a 100 Å thick thorium fluoride layer and a 50 Å thick chromium layer. Polarization coating 110 comprises alternating layers of zinc sulfide (ZnS) and germanium (Ge) which are deposited by vapor deposition. An appropriate refractive index liquid 112 is Cargille M Series Refractive Index Liquid (n($\lambda$=5893 A)=1.78). Adhesive 202 is preferably Hardmans Kalex® urethane.

Figure 3:
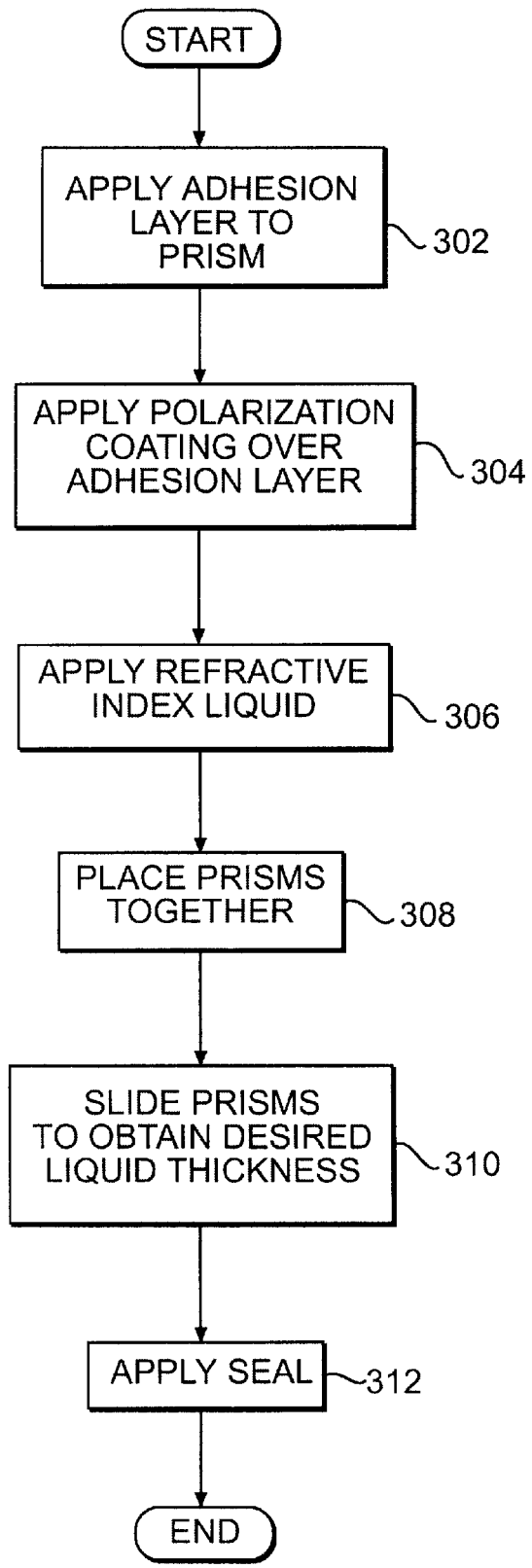
FIG. 3 is a flow chart showing a preferred embodiment of the manufacturing process of the beamsplitter cube according to the invention.

FIG. 3 is a flowchart showing an inventive method of manufacturing the beamsplitter of the present invention. As shown in FIG. 3, the process starts at Block 302 with the application of adhesion layer 106 to prism 102. Next, in Block 304, polarization coating 110 is applied over adhesion layer 304.

As shown beginning with Block 306, the next steps in bonding the second prism 104 to the polarization coatings on the first prism 102 entail applying and encapsulating refractive index liquid 112 between the hypotenuse 103 of first prism 102 and the hypotenuse 105 of second prism 104. The maximum thickness of the refractive index liquid 112 over the entire hypotenuse interface is preferably less than 600 nm to achieve greater than 95% p-polarization transmission. A reduction in the thickness of refractive index liquid 112 increases p-polarization transmission. The minimum thickness of refractive index liquid 112 is limited by the flatness of polarization coating 110 and the viscosity of refractive index liquid 112.

One technique to achieve correct layer thickness of refractive index liquid 112 is to apply a drop of refractive index liquid 112 on the hypotenuse 105 of the second prism 104 (or else to the corresponding surface of polarization coating 110), place the hypotenuse of the first prism 102 over the second prism 104 (Block 308), and squeeze the excess refractive index liquid 112 out by working the two prisms together with a sliding motion (Block 310). The thickness of the layer can be monitored by viewing white light interference fringes visible through second prism 104. Air bubbles formed in the refractive index liquid 112 during assembly should ideally be eliminated to produce a high transmission coating. Air bubbles can be reduced and eliminated by working the two prisms against each other with a slow sliding motion.

Another technique to achieve correct layer thickness of refractive index liquid 112 is to apply a measured drop of refractive index liquid 112 on the hypotenuse 105 of second prism 104 (or on the surface of polarization coating 110) (Block 306). When following this method, the drop size of the refractive index liquid 112 should be measured precisely so that it is sufficient to completely cover the hypotenuse of first prism 102 when the hypotenuse of second prism 104 is placed over first prism 102, yet is small enough so that it is not necessary to remove excess refractive index liquid 112. The prisms are placed one on top of the other (Block 308), and the weight of second prism 104 will displace the air in the hypotenuse interface of first prism 102 and second prism 104 with the refractive index liquid 112. A slight sliding motion (Block 310) can be used to complete the refractive index liquid 112 coverage around the edges of the interface between first prism 102 and second prism 104. It has been found that small air bubbles remaining in the refractive index liquid 112 after application of the adhesive 202 in this method disappeared and did not affect the performance of the beamsplitter. This is a feature of the present invention, since the elimination of small bubbles would require further sliding of the first and second prisms 102 and 104, which might damage either the polarization coating or the zinc selenide substrate.

Once the desired thickness of liquid 112 has been achieved, it is encapsulated in the prism assembly by sealing all four exposed edges of the assembled prisms (Block 312). This sealing operation is performed in the preferred embodiment using adhesive 202 (shown in FIG. 2), which as noted above may be Hardmans Kalex® Urethane. It has been found that the urethane cures quickly, minimizing the time that the two materials can interact with each other. This is a useful feature of the present invention since M series refractive index fluid is somewhat corrosive, and many standard adhesives are not compatible with it.

Figure 4:
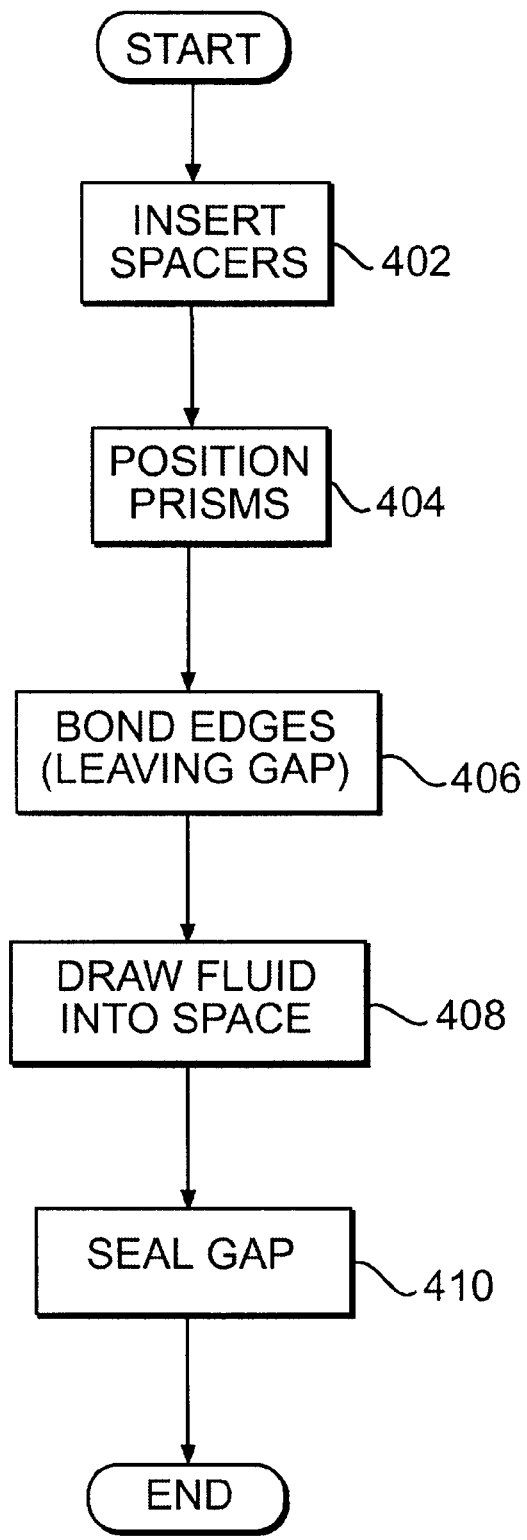
FIG. 4 is a flow chart showing an alternate preferred embodiment of the manufacturing process of the beamsplitter cube according to the invention.

FIG. 4 is a flowchart showing another useful technique for assembling the beamsplitter of the present invention. In this method, the prisms are assembled before the fluid is installed. First, spacers may be installed (Block 402) to achieve the desired separation between first prism 102 and second prism 104. The prisms are positioned adjacent each other (Block 404) and the edges of the hypotenuse of first prism 102 are bonded to the edges of the hypotenuse of second prism 104 with an adhesive (Block 406). A gap is left in the adhesive bond to allow access to the interior of the assembled beamsplitter. Fluid is then drawn into the space between the prisms (Block 408). This is accomplished by placing the assembled beamsplitter so that the gap is in contact with a quantity of refractive index liquid 112. Under vacuum, capillary action displaces the air between the prisms with refractive index liquid 112. After removing the assembled beamsplitter from the vacuum, the gap in the bond is filled with adhesive (Block 410).

Operation and use of the midwave infrared polarizing beamsplitter cube produced in this manner is simple and straightforward. As shown in FIG. 2, when unpolarized (or elliptically polarized) infrared radiation 204 of the design wavelength is incident on the leg of first prism 102, it propagates through to the hypotenuse 103 of first prism 102. Adhesion layer 106 is sufficiently thin as to be inconsequential to the incident radiation, so the infrared radiation propagates through the adhesion layer and into polarization coating 110. Polarization coating 110 divides the unpolarized infrared radiation into two orthogonal components (p polarization and s polarization) dictated by the exact design of the polarization coating. The transmitted beam 206 (p polarization) propagates undeviated through the refractive index liquid 112 and second prism 104 and exits the beamsplitter in the same direction of propagation as the incident beam 204. The reflected beam (s polarization) is reflected off the polarizing coating 110 and passes back into first prism 102 where it exits the beamsplitter orthogonal to the incident beam, as shown at 208. The beamsplitter cube 100 is rotationally symmetric. Although the above description describes operation when light is incident from one direction, operation is identical when the infrared radiation is incident on any of the legs of either prism 102 or prism 104.

Depending on the design of polarization coating 110, different amounts of p and s polarization can be divided into the transmitted (p polarization) or reflected (s polarization) beams. The most common use for this beamsplitter is to design the polarization coating (PC) so that most or all of the p polarization is transmitted, and the s polarization is reflected. However, the polarization coating can be designed to provide a wide variety of different combinations of transmitted and reflected polarizations. For instance, the polarization coating could be designed to reflect both p and s polarizations for a given wavelength λ1, and transmit both p and s polarizations for a second wavelength λ2.

Accordingly, a fabrication technique has been disclosed which can join two members so as to defeat total internal reflection at the member interface in a simple, reliable manner. The invention provides a bonding technique which reduces optical and mechanical fabrication tolerances, which is relatively inexpensive to fabricate, which provides better polarizing performance, and which provides a generally improved method of fabricating infrared polarizing beamsplitter cubes. This fabrication technique results in a unique and advantageous beamsplitter structure.

Although the description above contains many specifications, these should not be construed as limiting the scope of the invention but as merely providing illustrations of some of the presently preferred embodiments of this invention. Various other embodiments and ramification are possible within it's scope . For example, the fabrication technique can be used to defeat total internal reflection that occurs at any optical interface.

Thus the scope of the invention should be determined by the appended claims and their legal equivalents, rather than by the examples given.

We claim:

1. A method of fabricating an infrared beamsplitter from first and second prismatic elements, comprising the steps of:

applying a polarization coating to the first prismatic element;

placing a refractive index liquid layer on one of said polarization coating and said second prismatic element, said refractive index liquid layer having a refractive index range between 1.705 to 1.800 and a thickness in combination with the flatness of said polarization coating and the viscosity of said refractive index liquid layer so as to beamsplit infrared, said thickness being less than 600 nm;

placing said second prismatic element over said first prismatic element so that said liquid coating is contained between said polarization coating and said second prismatic element, wherein said first and second prismatic elements have matching refractive indexes so as to beamsplit infrared; and sealing the edges of said assembly to maintain said refractive index liquid layer between said first prismatic element and said second prismatic element.

2. The method of claim 1, further comprising the step of sliding said first prismatic element over said polarization coating to establish a reduced uniform thickness of said refractive index liquid layer.

3. The method of claim 1, wherein said step of applying a polarization coating further includes applying an adhesion layer between said first prismatic element and said polarization coating to increase adhesion of the polarization coating to the first prismatic element.

4. The method of claim 1, wherein said polarization coating comprises alternating layers of zinc sulfide and germanium.

5. The method of claim 1, wherein said first and second prismatic elements are made of ZnSe.

6. The beamsplitter of claim 1 further comprising adhesion layer between said first prismatic element and said polarization coating for increasing adhesion of said first prismatic element and said polarization coating.

7. The infrared beamsplitter of claim 6, wherein said adhesion layer comprises chromium and thorium fluoride.

8. A method of fabricating an infrared beamsplitter from first and second prismatic elements, comprising the steps of:

applying a polarization coating to the first prismatic element;

placing a liquid coating on one of said polarization coating and said second prismatic element, including forming said liquid coating with a refractive index range between 1.705 to 1.800 and with a thickness in combination with the flatness of said polarization coating and the viscosity of said refractive index liquid layer so as to beamsplit infrared, said thickness being less than 600 nm;

placing said second prismatic element over said first prismatic element so that said liquid coating is contained between said polarization coating and said second prismatic element, wherein said first and second prismatic elements have matching refractive indexes so as to beamsplit infrared; and sealing the edges of said assembly to maintain said liquid coating between said first prismatic element and said second prismatic element, wherein said step of applying a polarization coating further includes applying an adhesion layer between said second prismatic element and said polarization coating to increase adhesion of the polarization coating to the first prismatic element, and wherein said adhesion layer comprises chromium and thorium fluoride.

9. A method of fabricating an infrared beamsplitter from first and second prismatic elements, comprising the steps of:

applying a polarization coating to the first prismatic element;

placing a liquid coating on one of said polarization coating and said second prismatic element;

placing said second prismatic element over said first prismatic element so that said liquid coating is contained between said polarization coating and said second prismatic element, wherein said first and second prismatic elements have matching refractive indexes so as to beamsplit infrared; and sealing the edges of said assembly to maintain said liquid coating between said first prismatic element and said second prismatic element, wherein said liquid coating is a refractive index liquid having a refractive index range between 1.705 to 1.800 and a thickness in combination with the flatness of said polarization coating and the viscosity of said refractive index liquid layer so as to beamsplit infrared, said thickness being less than 600 nm.

10. The method of claim 9, wherein said adhesive is a urethane adhesive compatible with said refractive index liquid.

11. A method of fabricating an infrared beamsplitter from first and second prismatic elements, comprising the steps of:

applying a polarization coating to the first prismatic element;

placing a liquid coating on one of said polarization coating and said second prismatic element;

forming said liquid coating with a refractive index range between 1.705 to 1.800 and with a thickness in combination with the flatness of said polarization coating and the viscosity of said refractive index liquid layer so as to beamsplit infrared, said thickness being less than 600 nm;

placing said second prismatic element over said first prismatic element so that said liquid coating is contained between said polarization coating and said second prismatic element, wherein said first and second prismatic elements have matching refractive indexes so as to beamsplit infrared; and sealing the edges of said assembly to maintain said liquid coating between said first prismatic element and said second prismatic element, wherein said step of applying a polarization coating further includes applying an adhesion layer between said second prismatic element and said polarization coating to increase adhesion of the polarization coating to the first prismatic element, and wherein said adhesion layer includes chromium and thorium fluoride.

12. An infrared beamsplitter comprising:
a first prismatic element having a surface;

a polarization coating on said surface of said first prismatic element;

a second prismatic element having a surface aligned with said surface of said first prismatic element, wherein said first and second prismatic elements have matching refractive indexes so as to beamsplit infrared;

a refractive index liquid layer occupying space between said surface of said first prismatic element and said surface of said second prismatic element said refractive index liquid layer having a refractive index range between 1.705 to 1.800 and a thickness in combination with the flatness of said polarization coating and the viscosity of said refractive index liquid layer so as to beamsplit infrared, said thickness being less than 600 nm; and a seal maintaining said refractive index liquid layer between said first prismatic element and said second prismatic element.

13. The infrared beamsplitter of claim 12, wherein said polarization coating comprises alternating layers of zinc sulfide and germanium.

14. The infrared beamsplitter of claim 12, wherein said first and second prismatic elements are made of ZnSe.

15. An infrared beamsplitter comprising:

a first prismatic element having a surface;

a polarization coating on said surface of said first prismatic element;

a second prismatic element having a surface aligned with said surface of said first prismatic element, wherein said first and second prismatic elements have matching refractive indexes so as to bean split infrared:, a liquid coating occupying space between said surface of said first prismatic element and said surface of said second prismatic element; and a seal maintaining said liquid coating between said first prismatic element and said second prismatic element, wherein said liquid coating is a refractive index liquid having a refractive index range between 1.705 to 1.800 and a thickness in combination with the flatness of said polarization coating and the viscosity of said refractive index liquid layer so as to beamsplit infrared, said thickness being less than 600 nm.

16. An infrared beamsplitter comprising:

a first prismatic element having a surface;

a polarization coating on said surface of said first prismatic element;

a second prismatic element having a surface aligned with said surface of said first prismatic element, wherein said first and second prismatic elements have matching refractive indexes so as to beamsplit infrared;

a liquid coating occupying space between said surface of said first prismatic element and said surface of said second prismatic element said refractive index liquid layer having a refractive index range between 1.705 to 1.800 and a thickness in combination with the flatness of said polarization coating and the viscosity of said refractive index liquid layer so as to beamsplit infrared, said thickness being less than 600 nm; and a seal maintaining said liquid coating between said first prismatic element and said second prismatic element, wherein said seal is a urethane adhesive seal compatible with said refractive index liquid.

17. An infrared beamsplitter comprising:

a first prismatic element having a surface;

a polarization coating on said surface of said first prismatic element;

a second prismatic element having a surface aligned with said surface of said first prismatic element, wherein said first and second prismatic elements have matching refractive indexes so as to beamsplit infrared;

an adhesion layer between said first prismatic element and said polarization coating for increasing adhesion of said first prismatic element and said polarization coating;

a liquid coating occupying space between said surface of said first prismatic element and said surface of said second prismatic element said refractive index liquid layer having a refractive index range between 1.705 to 1.800 and a thickness in combination with the flatness of said polarization coating and the viscosity of said refractive index liquid layer so as to beamsplit infrared said thickness being less than 600 nm; and a seal maintaining said liquid coating between said first prismatic element and said second prismatic element.

* * * * *